United States Patent
Revel et al.

(10) Patent No.: US 9,121,428 B2
(45) Date of Patent: Sep. 1, 2015

(54) ASSEMBLY PROVIDING A CONNECTION THAT IS SELF TIGHTENING WITH TEMPERATURE

(71) Applicant: HERAKLES, Le Haillan (FR)

(72) Inventors: Thomas Revel, Bordeaux (FR); Benoit Carrere, Le Taillan Medoc (FR); Gautier Mecuson, Bordeaux (FR)

(73) Assignee: HERAKLES, Le Haillan (FR)

( * ) Notice: Subject to any disclaimer, the term of this patent is extended or adjusted under 35 U.S.C. 154(b) by 0 days.

(21) Appl. No.: 14/307,554

(22) Filed: Jun. 18, 2014

(65) Prior Publication Data
US 2014/0369785 A1    Dec. 18, 2014

(30) Foreign Application Priority Data

Jun. 18, 2013  (FR) ...................................... 13 55705

(51) Int. Cl.
| F16B 19/08 | (2006.01) |
| F16B 19/04 | (2006.01) |
| F16B 19/05 | (2006.01) |
| F16B 19/10 | (2006.01) |

(52) U.S. Cl.
CPC ................. F16B 19/04 (2013.01); F16B 19/05 (2013.01); F16B 19/1027 (2013.01)

(58) Field of Classification Search
CPC .............. F16B 5/01; F16B 5/04; F16B 19/06; F16B 19/08; F16B 19/10; F16B 19/1027
USPC .................. 411/82.5, 500, 501, 506, 509
See application file for complete search history.

(56) References Cited

U.S. PATENT DOCUMENTS

| 5,245 | A | * | 8/1847 | Wood ............................ 411/507 |
| 2,001,145 | A | * | 5/1935 | Lambert et al. ................. 29/510 |
| 2,327,924 | A | * | 8/1943 | Mounts ......................... 411/501 |
| 2,482,391 | A |   | 9/1949 | Webster |
| 2,505,915 | A |   | 5/1950 | Salmi |
| 2,529,420 | A | * | 11/1950 | Ramquist ................... 242/597.4 |
| 3,301,122 | A | * | 1/1967 | Wagner ........................ 411/361 |
| 3,405,594 | A | * | 10/1968 | Falcioni ....................... 411/501 |
| 3,724,614 | A |   | 4/1973 | Bender |
| 4,221,041 | A | * | 9/1980 | Hufnagl et al. ................. 29/512 |
| 4,253,226 | A | * | 3/1981 | Takeda ........................ 29/432.1 |
| 4,687,394 | A |   | 8/1987 | Berecz |
| 4,854,438 | A | * | 8/1989 | Weissenberger et al. . 192/107 R |
| 5,299,667 | A |   | 4/1994 | Hammond |

FOREIGN PATENT DOCUMENTS

| CA | 570864 A | 2/1959 |
| GB | 1185196 A | 3/1970 |
| WO | 91/01456 A1 | 2/1991 |

OTHER PUBLICATIONS

Search Report from corresponding French Application No. FR1355705, created Jan. 28, 2014.

* cited by examiner

*Primary Examiner* — Roberta Delisle
(74) *Attorney, Agent, or Firm* — Workman Nydegger

(57) ABSTRACT

The invention relates to an assembly comprising first and second parts made of composite material and held against each other by at least one fastener system comprising a rivet having a flat head from which there extends a shank having an enlarged end, and a washer co-operating with the enlarged end of the shank of the rivet, the head of the rivet bearing against a countersink formed in the first part, the washer bearing against the second part. On its face remote from its face bearing against the second part, the washer presents a portion of conical shape. The washer also has a central countersink with the enlarged end of the shank of the rivet pressing thereagainst.

19 Claims, 2 Drawing Sheets

ASSEMBLY PROVIDING A CONNECTION THAT IS SELF TIGHTENING WITH TEMPERATURE

BACKGROUND OF THE INVENTION

The invention relates to using a mechanical connection to assemble together parts made of thermostructural composite material, such as a ceramic matrix composite (CMC) material or a carbon/carbon (C/C) material, where such a material is typically constituted by a porous substrate, such as a porous fiber substrate, that is densified by a ceramic matrix. The fibers of the substrate may in particular be made of carbon or of ceramic. The matrix is made of a refractory ceramic such as, by way of example: a refractory carbide, nitride, boride, or oxide. Thermostructural composite materials are remarkable because of their mechanical properties that make them suitable for constituting structural elements, and because of their ability to conserve these properties at high temperatures.

The invention relates more particularly to the aerodynamic and thermal behavior of mechanical connections used for assembling together parts made of thermostructural composite material when the parts are to be immersed in a high-temperature stream, for example as when fabricating all or part of afterbody assemblies for aeroengines such as exhaust cones (also known as "exhaust plugs"), or flaps for a variable-section nozzle.

In these applications, the parts for assembling together are generally relatively fine (thickness of a few millimeters), and they need to satisfy aerodynamic requirements, which means that it is preferred to use rivets for making the mechanical connections between the parts. With assemblies used for making aeroengine afterbody parts, it is general practice to use rivets that present on one side of the assembly a flat head (i.e. a head of frustoconical shape with an end that is flat) that is received in a countersink formed in one of the parts to be assembled together, and on the other side, a column or a washer serving to take up differential expansion between rivets, which expand considerably, and the parts made of thermostructural composite material, which expand little. By incorporating the head of the rivet in a countersink present on one side of the assembly, it is possible to obtain good aerodynamic performance, but only on that side of the assembly, since the presence of the column and of a portion of the body of the rivet on the other side of the assembly gives rise to considerable drag.

Another solution, which is used in making flaps for a variable section nozzle, consists in connecting the parts made of thermostructural composite material together with rivets, such as those sold under the trademark Fybrfast®, which rivets have at one end a head and at the other end an end portion that is pressed and flattened in order to fasten the parts together. Nevertheless, with that type of rivet, the head and the flattened portion of the body of the rivet project from either side of the assembly and consequently they project beyond the streamlining of the assembly.

OBJECT AND SUMMARY OF THE INVENTION

An object of the invention is to propose a solution for assembling together parts made of composite material using one or more fastener systems that present a coefficient of thermal expansion that is greater than the coefficient of thermal expansion of the parts made of composite material, it being necessary for the fastener system to have little or no impact on the aerodynamic performance of the assembly.

This object is achieved with an assembly comprising first and second parts made of composite material and held against each other by at least one fastener system comprising a rivet having a flat head from which there extends a shank having an enlarged end, and a washer co-operating with the enlarged end of the shank of the rivet, the head of the rivet bearing against a countersink formed in the first part, the washer bearing against the second part. In accordance with the invention, the washer presents a portion of conical shape on its face opposite from its face bearing against the second part, and said washer also includes a central countersink with the enlarged end of the shank of the rivet resting thereagainst.

Thus, the assembly of the invention is made with mechanical connections that are completely integrated on one side of the assembly (flat head of the rivet integrated in the countersink in the first part) and that present a streamlined profile on the other side (enlarged end of the shank of the rivet masked inside the washer that presents a portion of conical shape on the outside). Consequently, the assembly of the invention can be immersed on both sides in a high-temperature stream without the connection systems degrading aerodynamic performance.

Also, the fastener system used is designed to apply a continuous additional holding force by radial expansion, thus making it possible to compensate for expansion, in particular axial expansion, of each of the fastener systems and to conserve a clamping force when hot.

In an embodiment of the assembly in accordance with the invention, the washer presents a plane portion on its face facing the second part.

In another embodiment of the assembly in accordance with the invention, the washer presents a conically shaped portion on its face facing the second part, which portion bears against a countersink formed in said second part. In this embodiment, the outside face of the washer may be partially or totally incorporated in the countersink of the second part, thereby further reducing the aerodynamic impact of the fastener system on the assembly.

In an aspect of the assembly of the invention, the rivet and the washer are made of a material selected from at least one of the following materials: Inconel® 725 or 718, Waspaloy®, Haynes® 282®, A286 stainless steel, and any other high-performance steel.

In another aspect of the assembly of the invention, the first and second parts are made of ceramic matrix composite material.

In yet another aspect of the assembly of the invention, each of the first and second parts presents thickness of less than 3 millimeters (mm).

Still in another aspect of the assembly of the invention, the first and second parts are parts of an afterbody of an aeroengine.

BRIEF DESCRIPTION OF THE DRAWINGS

Other characteristics and advantages of the invention appear from the following description of particular embodiments of the invention, given as non-limiting examples and with reference to the accompanying drawings, in which.

DETAILED DESCRIPTION OF EMBODIMENTS

The present invention applies in general manner to any assembly between parts made of composite material using one or more fastener systems that present a coefficient of thermal expansion that is greater than the coefficient of thermal expansion of the parts made of composite material, it being necessary for the fastener system to have little or no impact on the aerodynamic performance of the assembly.

The parts for assembling together may be made in particular out of thermostructural ceramic matrix composite (CMC) material, i.e. out of a material constituted by reinforcement made of refractory fibers (carbon or ceramic) densified by a ceramic matrix that is likewise refractory, i.e. materials such as C/SiC, SiC/SiC, C/C—SiC, etc. The parts could also be made of other thermostructural composite materials presenting a low coefficient of thermal expansion, such as C/C materials (reinforcement and matrix both made of carbon).

The assembly of the invention is particularly, but not exclusively, for use in making all or part of afterbody assemblies of aeroengines such as exhaust cones (also known as "exhaust plugs") or flaps for variable-section nozzles. The assembly of the invention is particularly adapted to assembling parts of small thickness, e.g. less than or equal to 3 mm.

Figure 1:
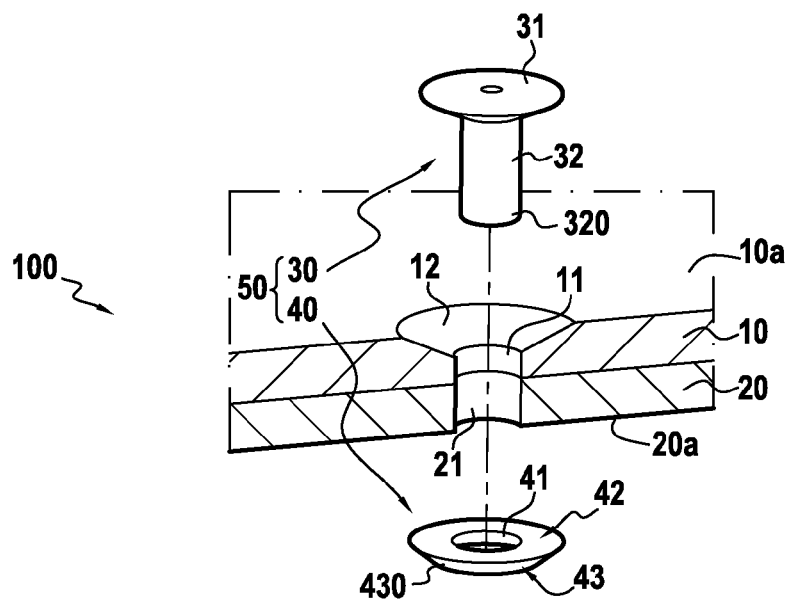
FIG. 1 is a diagrammatic perspective view showing an assembly being made in accordance with an embodiment of the invention.
Figure 2A:
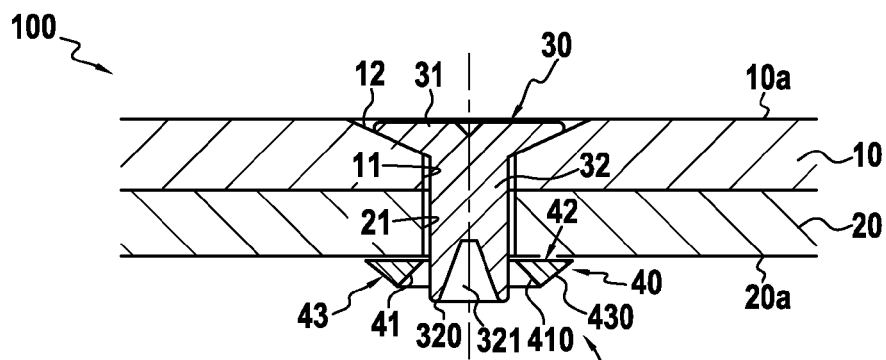
FIGS. 2A and 2B are diagrammatic views respectively in section and a plan view showing subsequent steps in making the FIG. 1 assembly.
Figure 2B:
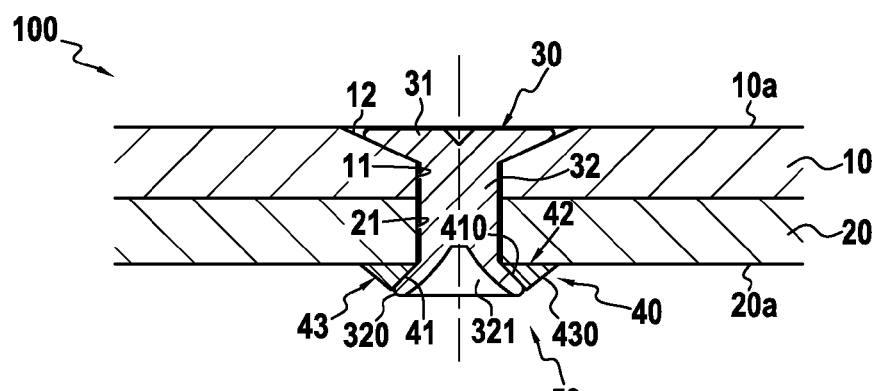

FIGS. 1, 2A, and 2B show an assembly in accordance with an embodiment of the invention. As shown in FIG. 1, an assembly 100 between two parts 10 and 20 made of CMC thermostructural composite material is itself made by means of a fastener system 50 comprising a rivet 30 and a washer 40. More precisely, the rivet 30 has a flat head 31 from which there extends a shank 32 for placing in orifices 11 and 21 formed in the parts 10 and 20, the flat head 31 being received in a countersink 12 formed in the part 10. The washer 40 has a central opening 41 for receiving the free end 320 of the shank 32. The washer 40 also has a plane first face 42 that is to be pressed against the outside surface 20a of the second part 20, and an opposite second face 43 presenting a portion of conical shape 430. The central opening 41 of the washer 40 includes a countersink 410. In particular, the rivet 30 and the washer 40 may be made out of any of the following materials: Inconel® 725 or 718, Waspaloy®, Haynes® 282®, A286 stainless steel, and any other high-performance steel.

As shown in FIG. 2A, the rivet 30 is positioned so that the shank 32 passes through the orifices 11 and 21 and so that the flat head 31 rests in the countersink 12 while the first face 42 of the washer 40 is pressed against the outside surface 20a of the part 20, the free end 320 of the shank 32 being present in the opening 41. As shown in FIG. 2B, the free end 320, which includes a central recess 321, is enlarged by being flattened so as to press down the edges of the end 320 against the countersink 410 of the central opening 41 of the washer 40. The free end may be enlarged while hot or cold depending on the material constituting the rivet and with the help of a riveting head. The two parts 10 and 20 are then secured to each other by riveting.

Still as shown in FIG. 2B, it can be seen that beside the outside face 10a of the part 10, the head 31 of the rivet is received in full in the countersink 12 and consequently has no impact on the aerodynamics of the part 10 (leaving a surface that is plane or "flush"). Beside the outside face 20a of the part 20, the conically-shaped face 43 of the washer 40 presents a streamlined profile that can reduce aerodynamic disturbances, the enlarged end 320 of the shank 32 of the rivet being received in the opening 41 of the washer 40.

Also, when the assembly 100 is subjected to high temperatures, e.g. when it is immersed in a hot stream of combustion gas, the radial expansion of the flat head 31 serves to maintain contact with the countersink 12, with this occurring in spite of the axial expansion of the rivet 30. A similar compensation effect occurs at the enlarged end portion 320 of the rivet 30 in contact with the countersink 410 of the opening 41 in the washer 40.

Figure 3:
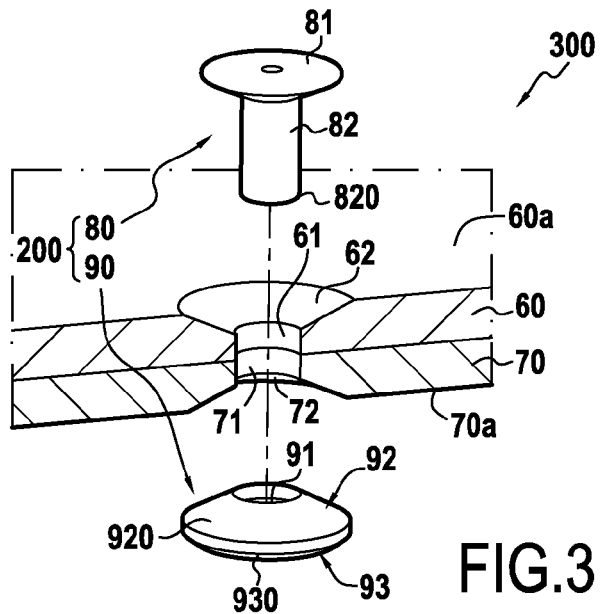
FIG. 3 is a diagrammatic perspective view showing an assembly being made in accordance with another embodiment of the invention.
Figure 4A:
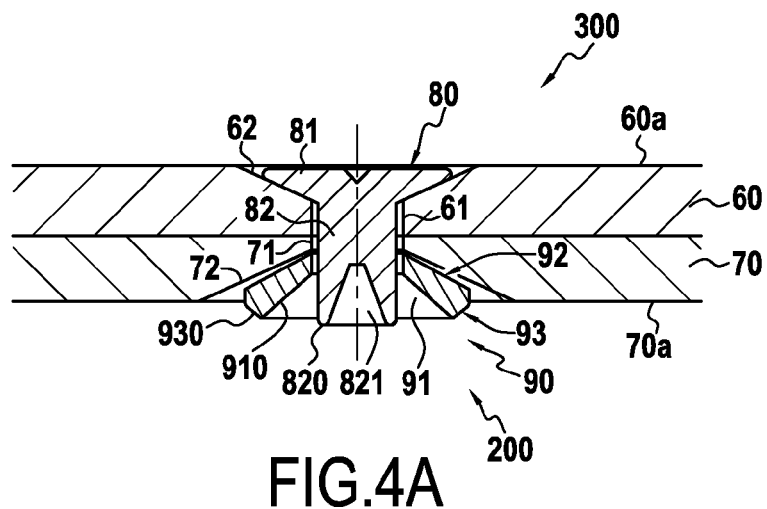
FIGS. 4A and 4B are diagrammatic views respectively in section and a plan view showing subsequent steps in making the FIG. 3 assembly.
Figure 4B:
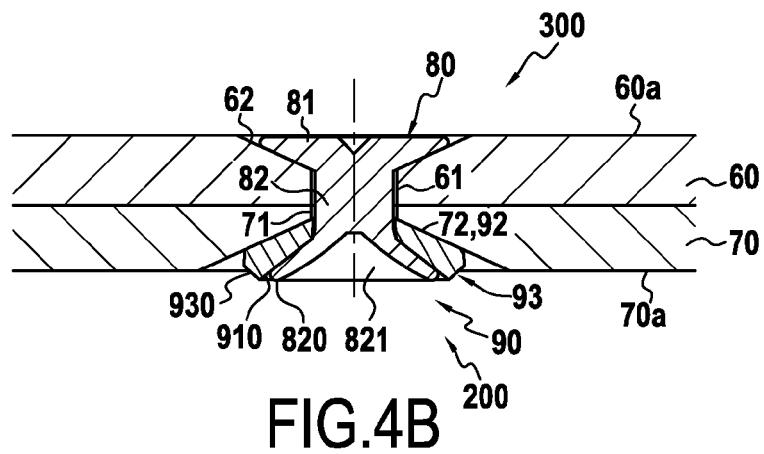

FIGS. 3, 4A, and 4B show an assembly in accordance with another embodiment of the invention. As shown in FIG. 3, an assembly 300 between two parts 60 and 70 made of CMC thermostructural composite material is itself made by means of a fastener system 200 comprising a rivet 80 and a washer 90 that are placed in orifices 61 and 71 formed in the parts 60 and 70. More precisely, the rivet 80 has a flat head 81 from which there extends a shank 82 for placing in orifices 61 and 71 formed in the parts 60 and 70, the flat head 81 being received in a countersink 62 formed in the part 60. The washer 90 has a central opening 91 for receiving the free end 820 of the shank 82. The washer 90 also has a conically-shaped portion 920 on its first face 92 facing the outside surface 70a of the part 70, which portion is to co-operate with a countersink 72 formed in the part 70. On its opposite second face 93, the washer also has a conically shaped portion 930. The central opening 91 of the washer 90 includes a countersink 910. In particular, the rivet 80 and the washer 90 may be made out of any one of the following materials: Inconel® 725 or 718, Waspaloy®, Haynes® 282®, A286 stainless steel, and any other high-performance steel.

As shown in FIG. 4A, the rivet 80 is positioned so that the shank 82 passes through the orifices 61 and 71 and so that the flat head 81 rests in the countersink 62 while the first face 92 of the washer 90 is pressed against the outside face 72 of the part 70, the free end 820 of the shank 82 being present in the opening 91. As shown in FIG. 4B, the free end 820, which includes a central recess 821, is enlarged by being flattened so as to press down the edges of the end 820 against the countersink 910 of the central opening 91 of the washer 90. The free end may be enlarged while hot or cold depending on the material constituting the rivet and with the help of a riveting head. The two parts 60 and 70 are then secured to each other by riveting.

Still as shown in FIG. 4B, it can be seen that beside the outside face 60a of the part 10, the head 81 of the rivet is received in full in the countersink 62 and consequently has no impact on the aerodynamics of the part 10 (leaving a surface that is plane or "flush"). Beside the outside face 70a of the part 70, the washer 90 is received for the most part in the countersink 72, with only the conical portion 930 of the second face 93 of the washer projecting a little from the surface 70a. With its conical portion 930, the face 93 of the washer 40 presents a streamlined profile that serves to reduce aerodynamic disturbances, the enlarged end 820 of the shank 82 of the rivet being received in the opening 91 of the washer 90.

Also, when the assembly 300 is subjected to high temperatures, e.g. when it is immersed in a hot stream of combustion gas, the radial expansion of the flat head 81 serves to maintain contact with the countersink 62, with this occurring in spite of the axial expansion of the rivet 80. A similar compensation effect occurs at the enlarged end portion 820 of the rivet 80 in contact with the countersink 910 of the opening 91 in the washer 90.

The invention claimed is:

1. An assembly comprising;
a first part and a second part, each of the first part and the second part being made of composite material, and wherein the first part is held against the second part by at least one fastener system, the fastener system including
a rivet having a flat head from which there extends a shank having an enlarged end, and
a washer co-operating with the enlarged end of the shank of the rivet,
wherein the head of the rivet bears against a countersink formed in the first part, and the washer bears against the second part;
wherein said washer presents a portion of conical shape on its face opposite from its face bearing against the second part, whereby the washer presents a streamlined profile with reduced aerodynamic drag, and
wherein said washer also includes a central countersink and the enlarged end of the shank of the rivet rests against the central countersink.

2. An assembly according to claim 1, wherein the washer presents a plane portion on its face facing the second part.

3. An assembly according to claim 1, wherein the washer presents a conically-shaped portion on its face facing the second part, which portion bears against a countersink formed in said second part.

4. An assembly according to claim 1, wherein the first and second parts are made of ceramic matrix composite material.

5. An assembly according to claim 1, wherein each of the first and second parts presents thickness of less than 3 mm.

6. An assembly according to claim 1, wherein the first and second parts are parts of an afterbody of an aeroengine.

7. An assembly according to claim 1, wherein the rivet or the washer is made of an age-hardened nickel-chromium-molybdenum-niobium-iron alloy.

8. An assembly according to claim 1, wherein the rivet or the washer is made of an age-hardened nickel-chromium-iron alloy.

9. An assembly according to claim 1, wherein the rivet or the washer is made of an age-hardened nickel-based superalloy.

10. An assembly according to claim 1, wherein the rivet or the washer is made of an age-hardened nickel-molybdenum-chromium alloy.

11. An assembly according to claim 1, wherein the rivet or the washer is made of A286 stainless steel.

12. An assembly according to claim 1, wherein the rivet or the washer is made of a high-performance steel.

13. An assembly according to claim 1, wherein the head of the rivet is received in full in the countersink formed in the first part, the flat head of the rivet being flush with the first part, the head of the rivet thereby having no impact on the aerodynamics of the first part.

14. A fastener assembly comprising:
a rivet having a flat head from which there extends a shank having an enlarged end; and
a washer co-operating with the enlarged end of the shank of the rivet;
wherein the head of the rivet is configured to bear against a countersink formed in a first part, and the washer bears against the second part, the fastener assembly being configured to fasten the first part to the second part,
wherein said washer presents a portion of conical shape on its face opposite from its face configured to bear against the second part, whereby the washer presents a streamlined profile with reduced aerodynamic drag, and
wherein said washer also includes a central countersink and the enlarged end of the shank of the rivet is configured to rest against the central countersink.

15. The fastener assembly according to claim 14, wherein the washer presents a plane portion on its face facing the second part.

16. The fastener assembly according to claim 14, wherein the washer presents a conically-shaped portion on its face facing the second part, which portion is configured to bear against a countersink formed in said second part.

17. The fastener assembly according to claim 14, wherein the head of the rivet is received in full in the countersink formed in the first part, the flat head of the rivet being flush with the first part, the head of the riven thereby having no impact on the aerodynamics of the first part.

18. The fastener assembly according to claim 14, wherein the rivet and washer are configured to accommodate the first part and the second part each having a thickness of less than 3 mm.

19. The fastener assembly according to claim 14, wherein the rivet or the washer is made of a material selected including an age-hardened nickel-chromium-molybdenum-niobium-iron alloy, an age-hardened nickel-chromium-iron alloy, an age-hardened nickel-based superalloy, an age-hardened nickel-molybdenum-chromium alloy, A286 stainless steel, or a high-performance steel.

* * * * *